3,285,963
**2-POLYCARBONALKYL-1,3-CYCLO-
PENTANEDIONES**
Gordon Alan Hughes and Herchel Smith, Wayne, Pa.,
assignors to Herchel Smith, Wayne, Pa.
Filed Apr. 15, 1965, Ser. No. 448,508
2 Claims. (Cl. 260—586)

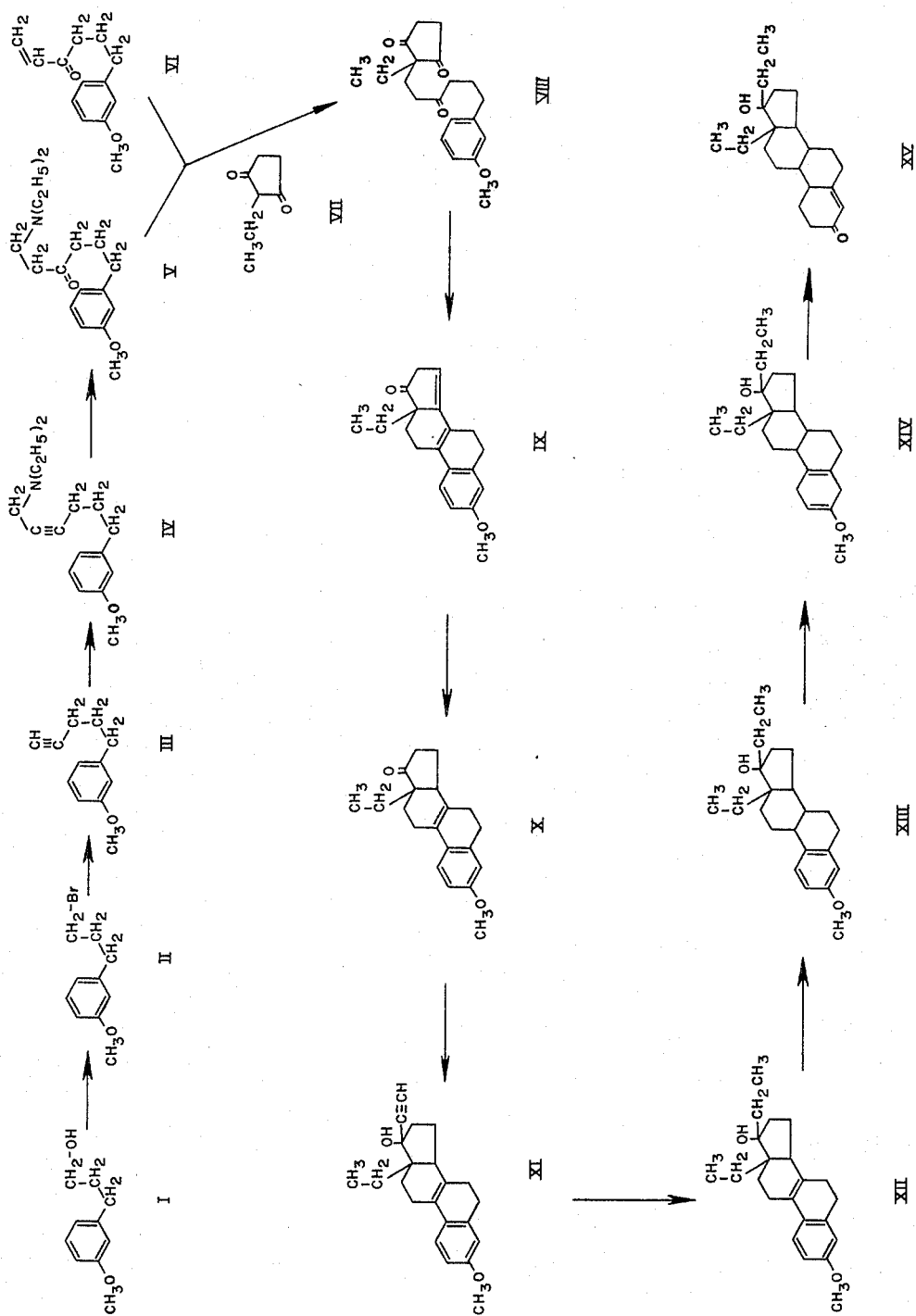

This application is a continuation-in-part of co-pending application Serial No. 362,572 filed April 27, 1964 now Patent No. 3,202,686 which is a continuation of Serial No. 228,384 filed October 4, 1962, the latter being a continuation of application Serial No. 57,904 filed September 23, 1960 now abandoned; Serial No. 91,341 filed February 24, 1961 now abandoned; Serial No. 137,535 filed September 12, 1961 now abandoned; Serial No. 195,000 filed May 15, 1962 now abandoned; and Serial No. 196,557 filed May 16, 1962, now abandoned.

This invention relates to compositions of matter classified in the art of chemistry as 2-polycarbonalkyl-1,3-cyclopentanediones.

In describing the invention, reference will be made in the following specification to the annexed drawing which illustrates schematically the reaction sequence for preparing totally synthetic steroid structures.

The invention sought to be patented in its composition aspect is described as residing in the concept of a compound having a 2-polycarbonalkyl-1,3-cyclopentanedione nucleus and specifically 2-ethyl - 1,3 - cyclopentanedione (VII of drawing).

The tangible embodiments of said composition aspect is described as residing in the concept of a compound having a 2-polycarbonalkyl-1,3-cyclopentanedione nucleus and specifically 2-ethyl-1,3-cyclopentanedione (VII of drawing).

The tangible embodiments of said composition aspect possess the use characteristic of being intermediates for the preparation of compositions which possess the use characteristic of exerting hormonal effects with unexpected separation of activity as evidenced by standard test procedures.

The tangible embodiments of the composition aspect and specifically 2-ethyl-1,3-cyclopentanedione also possess the use characteristic of exerting anti-androgenic effects and anti-viral activity e.g., anti-Herpes simplex activity.

The manner and process of making and using the invention will now be generally described so as to enable a person skilled in the art of chemistry to make and use the same, as follows:

The starting materials for the prepartion of the compounds of the invention are generally known or are readily prepared by procedures known to those skilled in the art of organic chemistry.

The appropriate polycarbonalkyl methyl ketone is condensed with diethyl oxalate in the presence of sodium ethanolate to form the corresponding 2,3,5-trioxocyclopentylglyoxalate. Heating with hydrochloric acid removes the glyoxalate substituent to form a 2-polycarbonalkylcyclopentane-1,3,4-trione. Careful addition of semicarbazide hydrochloride in buffered solution with stirring produces the corresponding semicarbazone derivative which on heating in a high boiling alcohol with potassium hydroxide is converted to the desired 2-polycarbon-alkyl-1,3-cyclopentanedione.

The first use characteristic of the compounds of the invention is illustrated as follows:

Referring now to the drawing wherein the compounds are assigned Roman numerals for identification schematically, the sequence of reactions involved in the synthesis of a tetracyclic compound, namely 13β-ethyl-3-methoxygona-1,3,5(10),8,14-pentaen-17-one, and the sequence of reactions involved in the use of said unsaturated gonane to prepare a 13-alkylgon-4-ene, specifically, 13β,17α-diethyl-17β-hydroxygon-4-en-3-one, is illustrated.

3-(m-methoxyphenyl) propanol (I) is heated with phosphorus tribromide in benzene after dropwise addition in the cold to form 3-(m-methoxyphenyl)-propyl bromide (II). This halogen compound (II) dissolved in tetrahydrofuran is condensed with sodium acetylide in liquid ammonia to obtain 5-(m-methoxyphenyl)-1-pentyne (III). Compound III is allowed to stand under nitrogen with water, 30% formalin, acetic acid, diethylamine, dioxan, and cuprous chloride at 70° C. for about 12 hours, whereby there is obtained 1-diethylamino-6-(m-methoxyphenyl)-2-hexyne (IV), which is in turn hydrated in the presence of a mercury salt and sulfuric acid to form 1-diethylamino - 6 - (m-methoxyphenyl)-3-hexanone (V). The ketamine (V) may eliminate diethylamine on distillation to give the vinyl ketone 6-(m-methoxyphenyl)-1-hexen-3-one (VI). Either the ketamine (V) or the ketone (VI), or mixtures thereof, is then reacted with 2-ethyl-1,3-cyclopentanedione (VII) under Michael condensation conditions, e.g. refluxing in methanolic potassium hydroxide to form 2-ethyl-2-[6-(m-methoxyphenyl)-3-oxohexyl]-1,3-cyclopentanedione (VIII).

Compound VIII is then cyclodehydrated at the reflux temperature of a solvent, such as benzene, in the presence of a dehydrating acid, such as p-toluene sulfonic acid, to effect simultaneous ring closures to give the tetraacyclic compound 13β-ethyl - 3 - methoxygona-1,3,5(10), 8,14-pentaen-17-one (IX). To use said compound the 14-unsaturation of Compound IX is then selectively hydrogenated in the presence of a metal catalyst, such as 2% palladized calcium carbonate, to form 13β-ethyl-3-methoxygona-1,3,5(10),8-tetraen-17-one (X). Ethynylation at the 17-position of Compound X with lithium acetylide in dimethylacetamide gives 13β-ethyl-17α-ethynyl-3-methoxygona-1,3,5(10),8-tetraen - 17β - ol (XI). The ethynyl group of Compound XI is then selectively hydrogenated to ethyl, as in the presence of a supported palladium catalyst, to produce 13β,17α-diethyl-3-methoxygona-1,3,5(10),8-tetraen-17β-ol (XIII) which is converted by alkali metal reduction in liquid ammonia into 13β,17α-diethyl - 3 - methoxygona-1,3,5(10)-trien-17β-ol, having the normal gonane configuration of 9,8-8,14-14, 13 exocyclic substituents, namely, trans-anti-trans.

By alkali metal reduction in liquid ammonia in the presence of a proton donor, such as ethanol (Birch reduction), Compound XIII is converted to 13β,17α-diethylgona-2,5(10)-dien-17β-ol (XIV). By hydrolysis in the presence of mineral acid, Compound XIV is then converted to 13β,17α-diethyl-17β-hydroxygon-4-en-3-one (XV).

In the Michael reaction step, the 1,3-cyclodione may also contain a hetero atom at positions other than position 2, thereby to provide a heterocyclic D-ring in the tetracyclic structure. By varying the group at the 2-position of the nucleophilic Michael condensation reactant, the invention provides a way to produce compounds resembling the natural steroids save at the 13-position. Thus, by varying the substituent at the 2-position of the 1,3-cyclopentanedione, alkyl groups of varying chain length such as, for example, ethyl, isopropyl, cetyl, etc., may be introduced to form the gonane correspondingly substituted at the 13-position. Further, gonanes may be prepared wherein the 13-position is substituted with any organic radical. Thus, but without limiting the generality of the foregoing, an aralyl, cycloalkylalkyl, or a polycarbon-alkylene bridge bearing a hydroxy-, amino, or alkylamino- substituent can readily be placed in the 13-position, and from such compounds other variations of the 13-position substituent can be prepared, as haloalkyls from hydroxyalkyls, or quaternary salts, amides, alkenyls, etc. from aminoalkyls.

The second use characteristic of the compounds of the invention derives from their anti-viral activity in laboratory animals as evidence by a standard screening procedure. This procedure is based on the determination of the ability of the test compound to protect against deaths caused by a virus, e.g. by Herpes simplex, in mice. Mice are selected at random and divided into three groups: 2 groups of 40 each and one group of 20.

One group of 40, is called the "pre-treatment" group, is divided into 4 subgroups of 10 each. Each subgroup is given a different dose of test compound starting 24 hours before infection with the virus and continuing for 96 hours post-infection. The second group of 40 mice, called the "no pre-treatment" group is similarly divided into 4 subgroups of 10 each, each subgroup receiving a different dose of test compound 30 minutes post-infection and continuing to 96 hours post-infection. In all cases the virus is inoculated intraperitoneally while the test compound is administered subcutaneously. The group of 20 mice is the virus control. Deaths are recorded daily for 21 days, at which time the experiment is terminated. The data are analyzed statistically to determine whether any significant protection was demonstrated, the accepted standard of $p < 0.05$ being required for significance. The virulence of the challenging dose of virus as reflected in the death rate of the control animals will be determinative of the particular death rate in the test animals which may be considered indicative of antiviral activity. Since absence of a dose-response relationship is a frequent characteristic of antiviral agents, if any dose provides significant protection, the substance is active.

The results obtained for 2-ethyl-1,3-cyclopentanedione follow:

| Dosage Group | Total Dose, mg. | Death Rate | | |
|---|---|---|---|---|
| | | Treated | Control | p Value |
| Pre-Treatment | 0.035 | 9/10 | 16/20 | (*) |
| | 0.35 | 6/10 | 16/20 | 0.30 |
| | 0.7 | 7/10 | 16 20 | 0.58 |
| | 1.4 | 9/10 | 16/20 | (*) |
| No Pre-Treatment | 0.035 | 4/10 | 16/20 | 0.047 |
| | 0.35 | 4/10 | 16/20 | 0.047 |
| | 0.7 | 8/10 | 16/20 | (*) |
| | 1.4 | 5/10 | 16/20 | 0.13 |

*Death of treated animals equal to or greater than death rate of controls.

The above data demonstrate that (2-ethyl-1,3-cyclopentanedione) is an active antiviral agent. In view of the low dose required to afford protection, it is, in fact, a very active anti-Herpes simplex agent. Moreover this activity is surprising in view of the lack of anti-viral activity in the same test of 2-methylcyclopentane-1,3-dione.

The following examples illustrate the manner of making the compounds of the invention.

*Example 1.—2-ethylcyclopentane-1,3-dione*

Dissolve 2-ethylcyclopentane-1,3,4-trione hydrate (30 g., M.P. 65–69°, Koenigs and Hopmann, Ber., 1921, 54, 1343) in ethanol (200 cc.) and water (100 cc.). To this solution add dropwise during 1 hour a solution of semicarbazide hydrochloride (21 g.) and sodium acetate (28.2 g.) in water (200 cc.) with vigorous stirring throughout. Filter off the semicarbazone precipitated, wash with methanol, and purify by stirring in refluxing methanol; filter to obtain a pale cream powder, M.P. 179–182°.

Dissolve the semicarbazone (34 g.) in a solution of potassium hydroxide (34 g.) in dry ethylene glycol at 130°, and heat the mixture to 160° for 1 hour, followed by 30 minutes at 180°. Distill the glycol at 0.01 mm., dissolve the residual solid in water (150 cc.) and make the solution acid to Congo Red with hydrochloric acid. Cool to 0° overnight and filter. Recrystallize the residue from water to obtain 2-ethylcyclopentane-1,3-dione (10 g.), M.P. 180° with sublimation.

*Example 2.—2-n-propylcyclopentane-1,3-dione*

Condense methyl n-butyl ketone with diethyl oxalate in the presence of sodium ethoxide, and convert the glyoxylate obtained by heating with hydrochloric acid to 2-n-propylcyclopentane-1,3,5-trione, from which prepare the semicarbazone, M.P. 285–289° (decomp.) using semicarbazide hydrochloride and sodium acetate.

Heat the semicarbazone with potassium hydroxide in ethylene glycol to obtain 2-n-propylcyclopentane-1,3-dione, M.P. 175°.

*Example 3.—2-isopropylcyclopentane-1,3-dione*

Add methyl isobutyl ketone (50 g.) and diethyl oxalate (160 g.) to an ice-cold solution of sodium (23 g.) in dry ethanol (350 cc.) with efficient stirring, and then reflux the mixture for 30 minutes, cool in ice and quickly add aqueous sulfuric acid (50%, 55 cc.). After 15 minutes filter off sodium sulfate, wash with ethanol and add the washings to the filtrate; next evaporate to dryness under reduced pressure to obtain ethyl 4-isopropyl-2,3,5-trioxocyclopentyl glyoxalate as an uncrystallizable oil. Boil this oil with 2 N hydrochloric acid (1500 cc.) for 1 hour and decant the hot solution from residual tarry material. Filter off the crystals which precipitate from the cooled decanted solution and recrystallize from aqueous ethanol as 2-isopropylcyclopentane-1,3,5-trione, M.P. 109–112°.

Treat the trione thus obtained (25 g.) by a procedure analogous to that described for the corresponding 2-ethyl compound to obtain 2-isopropylcyclopentane-1,3-dione (8.9 g.), M.P. 146°.

To prepare 2-(2-hydroxyethyl)cyclopentane-1,3-dione treat 4-oxopentan-1-ol with diethyl oxalate, then subject to acid hydrolysis and treat the trione so obtained by the procedure described for the above isopropyl compound.

To prepare 2-(2-dimethylaminopropyl)cyclopentane-1,3-dione treat 1-dimethylamino-hexan-5-one with diethyl oxalate, then subject to acid hydrolysis and treat the trione so obtained by the procedure described for the above isopropyl compound.

To prepare 2-(2-hydroxypropyl)cyclopentane-1,3-dione treat 2-hydroxyhexan-5-one with diethyl oxalate, then subject to acid hydrolysis and treat the trione so obtained by the procedure described for the above isopropyl compound.

To prepare 2-phenethylcyclopentane-1,3-dione treat 1-phenylpentan-4-one with diethyl oxalate, then subject to acid hydrolysis and treat the trione so obtained by the procedure described for the above isopropyl compound.

To prepare 2-isopentylcyclopentane-1,3-dione treat 2-methylheptan-6-one with diethyl oxalate, then subject to acid hydrolysis and treat the trione so obtained by the procedure described for the above isopropyl compound.

*Example 4.—2-n-butylcyclopentane-1,3-dione*

Condense methyl n-pentyl ketone with diethyl oxalate in the presence of sodium ethoxide, and convert the glyoxylate obtained by heating with hydrochloric acid to 2-n-butylcyclopentane-1,3,5-trione, from which prepare the semicarbazone, M.P. 285–290° (decomp.) using semicarbazide hydrochloride and sodium acetate. Heat the semicarbazone with potassium hydroxide in ethylene glycol to obtain 2-n-butylcyclopentane-1,3-dione, M.P. 149–151°.

*Example 5.—2-Isobutyl-1, 3-cyclopentanedione*

Add methyl isoamyl ketone (228.4 g.) and diethyl oxalate (644.1 g.) to an ice-cold solution of sodium methoxide (244 g.) in dry ethanol (1400 cc.) with vigorous stirring and reflux the mixture for 1½ hours, cool in ice water and then add aqueous sulfuric acid (202 cc. conc. sulfuric acid; 1460 cc. H₂O). After refluxing for 1½ hours, cool the reaction mixture containing 2-isobutylcyclopentane-1,3,5,-trione to 25° and treat with aqueous sodium hydroxide (50%; 585 cc.). Filter off sodium sulfate precipitate and wash with methanol (800 cc.). Add the washings to the filtrate and adjust the pH of the resulting solution to 4.5 by adding glacial acetic acid (96 cc.). To this solution add dropwise and with stirring over a period of 40 minutes a solution of semicarbazide hydrochloride (223 g.) and sodium acetate (196 g.) in water (860 cc.). Filter off the precipitate, wash with water (3×380 cc.), methanol (3×380 ml.) and dry, to obtain 3-isobutyl-1,2,4-cyclopentanetrione-1-semicarbazone (184 g., 40.8%); M.P. 277°.

Add the semicarbazone (184 g.) to a solution of sodium methoxide (140 g.) in decanol (817 cc.) at 120° during 30 minutes and slowly raise the temperature to 200° to remove volatiles boiling below this temperature and then maintain between 205-215° for 3 hours. After lowering the temperature to 80°, add water (820 cc.) and stir the mixture until the solids dissolve. Adjust the pH of the mixture to 8 by adding aqueous hydrochloric acid and separate the two layers. Extract the decanol layer with 2 portions (each 150 cc.) of water and wash the combined water layers with toluene. Make the aqueous solution acid to Congo Red with hydrochloric acid, cool to 10°, filter and dry the product, to obtain 2-isobutyl-1,3-cyclopentanedione (113.6 g., 90.6%); M.P. 194-196° after crystallization from ethanol.

$C_9H_{14}O$—Calculated: C, 70.02%; H, 9.15%. Found: C, 70.31%; H, 9.25%.

*Example 6.—2-cetylcyclopentane-1,3-dione*

Condense methyl n-heptadecyl ketone with diethyl oxalate in the presence of sodium ethoxide to give ethyl 4-cetyl-2,3,5-trioxocyclopentyl glyoxylate, which is isolated and recrystallized from hexane, M.P. 69°. Reflux this ester with concentrated hydrochloric acid to obtain 2-cetylcyclopentane-1,3,5,-trione monohydrate, M.P. 97–102°, from which prepare the semicarbazone, M.P. 261° (decomp.) using semicarbazide hydrochloride and sodium acetate. Heat the semicarbazone with potassium hydroxide in ethylene glycol to obtain 2-cetylcyclopentane-1,3-dione, M.P. 128–130°, on recrystallization from chloroform.

*Example 7.—2-diethylaminoethylcyclopentane-1,3-dione*

Dissolve sodium (11.5 g.) in absolute alcohol (175 ml.), cool to 0° C., and add a solution of ethyloxalate (80.0 g.) and 5-diethylaminopentanone-2 (38.0 g.) while stirring during ¾ hour. After the reaction mixture is stirred another hour, reflux for 30 minutes followed by cooling to 5° C. Acidify the reaction mixture with HCl gas and after separating from NaCl, evaporate to dryness (86.0 g.). Reflux the ester with 2 N HCl (500 ml.) for 1 hour and evaporate the reaction mixture to approximately 100 ml. After neutralizing with NaHCO₃ extract the reaction mixture with CHCl₃ in a continuous extractor. Dry the original layer over Na₂SO₄ and remove the solvent.

Dissolve the residue (21.1 g.) in water (500 ml.) and adjust the pH of the resulting solution to 7 by addition of 2 N hydrochloric acid. Extract the solution with chloroform. Dry the organic layer, filter and remove the chloroform by distillation. Distill the product at 0.01 mm. to obtain 2-diethylaminoethylcyclopentane-1,3,4-trione, M.P. 149°.

$C_{11}H_{17}NO_3$—Calculated: C, 62.56; H, 8.11; N, 6.63. Found: C, 62.55; H, 8.4; N, 6.52.

Treat the foregoing cyclopentanetrione (21.1 g.) in ethanol (500 cc.) with semicarbazide hydrochloride (11.1 g.) and anhydrous sodium actate (9.2 g.) and stir for 2 hours. Add charcoal and celite and filter. Add ether to the filtrate until turbid and refrigerate for 16 hours. Filter, wash the residue with ether and dry to obtain 2-diethylaminoethylcyclopentane-1,3,4-trione, 4-semicarbazone as a hygroscopic solid 24.0 g. Dissolve this solid (22 g.) in ethylene glycol (200 cc.) containing potassium hydrozide (22 g.) at 130°, heat at 160° for 1 hour and then at 180° for 30 minutes. Evaporate at 100°/1 mm. and dissolve the residue in water (50 cc.) Acidify to pH 6 with 2 N hydrochloric acid and adjust to pH 7 with sodium bicarbonate. Continuously extract with chloroform for 16 hours, dry and evaporate the chloroform solution to obtain an oil (10 g.). Distill at 0.01 mm. and after a forerun obtain a fraction, boiling point 110–135° which crystallizes. Redistill to obtain the title product (2.5 g.), M.P. 94–95°.

$C_{11}H_{19}NO_2$—Calculated: C, 66.97%; H, 9.71%; N, 7.10%. Found: C, 66.76%; H, 10.35%; N, 6.91%.

The subject matter which the applicants regard as their invention is particularly pointed out and distinctly claimed as follows:

1. 2-ethyl-1,3-cyclopentanedione.
2. 2-propyl-1,3-cyclopentanedione.

References Cited by the Examiner

UNITED STATES PATENTS 2,668,858  2/1954  Miescher et al. ___ 260—586 X

OTHER REFERENCES

Stetter et al., "Chem. Ver.," vol. 85, p. 67 (1952).
Woodward et al., "J. Am. Chem. Soc.," vol. 65, pp. 562-5 (1943).

LEON ZITVER, *Primary Examiner.*

DANIEL D. HORWITZ, *Examiner.*

M. JACOB, *Assistant Examiner.*

Disclaimer 3,285,963.—*Gordon Alan Hughes* and *Herchel Smith*, Wayne, Pa. 2-POLY-CARBONALKYL-1,3-CYCLOPENTANEDIONES. Patent dated Nov. 15, 1966. Disclaimer filed Jan. 7, 1974, by the assignee, *Herchel Smith*.

Hereby enters this disclaimer to claims 1 and 2 of said patent.

[*Official Gazette April 16, 1974.*]